United States Patent Office 2,741,541
Patented Apr. 10, 1956

2,741,541

PRODUCTION OF URANIUM SULPHATE

Sanford B. Smith, Woodstown, N. J., assignor to the United States of America as represented by the United States Atomic Energy Commission No Drawing. Application October 20, 1944,
Serial No. 559,662

6 Claims. (Cl. 23—14.5)

This invention relates to the recovery of uranium from mixtures containing lower uranium oxides. It is particularly concerned with the treatment of mixtures in which substantial proportions of the uranium are present as free metal or as uranium tritoctaoxide ($U_3O_8$) or dioxide ($UO_2$).

In the past it has been proposed to treat hexavalent uranium ores such as carnotite with sulfuric acid to convert the uranium to uranyl sulfate. However the treatment of tetravalent forms of uranium in the same way is relatively ineffective for dissolving the uranium because these forms of uranium are soluble only with difficulty.

It is an object of the invention to convert oxides of uranium of valence less than six to water-soluble form. A further object is the conversion of tetravalent uranium oxides to soluble form without the use of acid-resistant high temperature converters and other relatively expensive equipment. A still further object of the invention is the conversion of lower uranium oxides to uranium sulfates. Yet further objects will become apparent from the following general description of the invention and the detailed illustrations of its application.

In accordance with the present invention an oxide of uranium of valence less than six is reacted with dilute sulfuric acid in the presence of a fluoride. I have found that the presence of a fluoride, even in exceedingly small amounts, greatly facilitates the conversion of these lower oxides of uranium to readily soluble form.

For the treatment of mixtures containing metallic uranium an oxidizing agent may be employed to oxidize the metal at the same time that it is being dissolved. In the case of uranium in tetravalent form no oxidizing agent is necessary to effect its solution in the dilute sulfuric acid as long as a fluoride is present. However, in many cases, it is desirable to convert the dissolved tetravalent uranium to the hexavalent form since in general tetravalent uranium has a lower solubility than hexavalent uranium and when present in high concentration tends to precipitate as basic sulfate from sulfuric acid solution upon partial neutralization or excessive dilution. Accordingly, an oxidizing agent may be introduced into the solution either during the dissolving process or after its completion to effect this conversion.

The process of the invention is especially suitable for the treatment of slags, or other scrap materials, designated generally "dross" herein, or air-roasted products thereof, obtained in the manufacture of metallic uranium by the tetrafluoride process, or of similar residues obtained by other processes.

In the tetrafluoride process uranium tetrafluoride is reacted with an alkali-metal or alkaline earth metal (including magnesium) or with beryllium or aluminum in a reaction vessel, which may be lined with a refractory material such as lime, and there is produced, in addition to a main body of metallic uranium, a slag comprising fluorides and oxides of the metals present and also quantities of unreacted liberating metal and metallic uranium which has failed to cohere with the body of metallic uranium produced as the primary product. Moreover in remelting and in working the metal, scraps may be produced of insufficient purity to permit their being worked up into finished metal products.

The uranium present in such dross is normally present as the free metal together with relatively small amounts of tetravalent uranium compounds. To render the metal more readily soluble, I subject it to a preliminary roast in air at a temperature between 300° and 1000° C. The preliminary air roast converts metallic uranium to lower oxides. From 30% to 90% or more of the uranium may be converted to $U_3O_8$ and most of the remainder to $UO_2$. A part of the $U_3O_8$ may react with alkali-metal or alkaline earth metal oxides when these materials are present, to form uranates, but in many cases a considerable proportion, at least, remains in the form of lower oxides.

For converting such products to soluble form, I may employ a dilute sulfuric acid solution containing 0.5% to 50% $H_2SO_4$ by weight. If the mixture to be treated is initially free of fluorides, a metal fluoride, such as magnesium, calcium or sodium fluoride, or hydrogen fluoride may be used. An amount of fluoride providing a fluorine content of the order of 5% of the uranium present is ample. The mixture to be dissolved is mixed with the dilute fluoride-containing sulfuric acid solution and heated at an elevated temperature, preferably between about 80° C. and the boiling point of the solution. This treatment forms a mixture of sulfates of tetravalent and hexavalent uranium. If free metal is present, an oxidizing agent more active than $H_2SO_4$ at the dilution employed, for example, air hydrogen peroxide, nitric acid, or a permanganate or chromate is added to oxidize the free metal. If it is desired to convert uranium to hexavalent form (as $UO_2SO_4$), this may be done by adding additional quantities of such an oxidizing agent.

It is not necessary that the quantity of sulfuric acid solution present during heating be sufficient to dissolve the uranium compounds completely. The reaction proceeds even though the soluble compound is formed in quantities exceeding its solubility. The product can then be dissolved completely merely by adding more water or sulfuric acid solution.

Hexavalent uranium may be recovered from the sulfuric acid solution by conventional recovery processes or, more advantageously, by the peroxide recovery method of Louis Spiegler, U. S. patent application Serial Number 559,665, filed October 20, 1944, entitled "Method of Isolating Uranium."

The following examples illustrate the invention. Proportions are by weight where not otherwise indicated.

Example 1a

An 82-gram sample of a slag which was obtained from the production of metallic uranium by the tetrafluoride process and which contained 30½% of uranium, 60% of which was present as hexavalent uranium, and the balance present as tetravalent and lower-valent uranium, and a substantial proportion of calcium and magnesium fluorides was heated with 250 grams of aqueous 20% sulfuric acid at a temperature of 85° to 95° C. for one hour. Since part of the acid was used up in neutralizing alkaline material in the slag, the effective concentration of $H_2SO_4$ in the solution was 10.7%. The uranium was completely dissolved at the end of the hour.

Example 1b

A 29.4-gram sample of an oxide product containing 85% uranium ($U_3O_8$) (obtained by roasting in air contaminated uranium metal) was heated in 228 grams of aqueous 12% sulfuric acid at a temperature of 85° to 95° C. for 1¾ hours. The product was practically unattacked by this treatment. A 2-gram portion of calcium fluoride was then added and the uranium oxide immediately began to dissolve to a noticeable degree. The mixture was heated for another hour to complete the solution of the uranium.

To the aqueous mixtures produced in Examples 1a and 1b, 9½ cc. and 5 cc., respectively, of aqueous 27½% hydrogen peroxide solution were added to convert uranium to hexavalent form and the mixtures were held at a temperature of about 90° for one hour. Calcium carbonate was then added to adjust the pH of the solutions to between 2.8 and 3.5 and the solutions were separated from solid matter. In each case 25 grams of uranium, corresponding to all the uranium in the sample, was recovered from the separated solution.

*Example 2*

A uranium dross left in the crucible when crude uranium was remelted and recast was roasted in air at 800° C. and milled to pass through a 200 mesh screen. Five samples of the roasted dross, containing 79% uranium and 3½% fluorine, were mixed with sulfuric acid as follows:

(a) A 100-gram sample of the roasted dross was mixed with 372 grams of aqueous 47% sulfuric acid and heated to a temperature of 95° to 100° C.;

(b) A 100-gram sample of the roasted dross was mixed with 515 grams of aqueous 34% sulfuric acid and heated to 95° to 100° C.;

(c) A 100-gram sample of the roasted dross was mixed with 372 grams of aqueous 47% sulfuric acid and heated to 85° to 90° C.;

(d) A 100-gram sample of the roasted dross was mixed with 515 grams of aqueous 34% sulfuric acid and heated to 85° to 90° C.;

(e) A 100-gram sample of the roasted dross was mixed with 372 grams of aqueous 47% sulfuric acid and heated to 117° to 118° C. The quantity of alkaline compounds in the roasted dross was such that after reaction thereof with sulfuric acid the $H_2SO_4$ concentration at the start of heating was 39% for samples (a), (c) and (e) and 27% for samples (b) and (d). The five samples were maintained at the specified temperatures between one and one and one-half hours. The volumes were then made up to 500 to 550 cc. by adding water and the mixtures were cooled to 40° C. An aqueous solution of 28% hydrogen peroxide (approximately 16 cc.) was added to each solution, and the solution was stirred 15 to 20 minutes, then heated to the boiling point to decompose any uranium peroxide formed and to produce soluble uranyl sulfate. Solid matter was then separated from the solution by filtration and the filter cakes were tested for uranium. The uranium detected in this manner in each of the samples was as follows:

Sample (a)—none
Sample (b)—none
Sample (c)—0.1% of the uranium in the original sample
Sample (d)—0.05% of the uranium in the original sample
Sample (e)—0.06% of the uranium in the original sample Since the alkaline earth metal fluorides are only sparingly soluble in dilute $H_2SO_4$ or neutral solution, the major proportion of the fluorides present in slags or dross of the types considered above remain undissolved and may be separated from uranyl sulfate in solution by filtration or decantation.

*Example 3*

Two portions of 516 parts of aqueous 3% $H_2SO_4$ were heated to boiling temperature and 5 parts of finely ground uranium dioxide ($UO_2$) were added to each while the solution was agitated. No indication of solution was observed.

To one of the mixtures one part of sodium fluoride (NaF) was added. The aqueous phase of this mixture immediately exhibited a greenish cast. Both mixtures were held at boiling temperature for ½ hour and water was added to maintain the volumes constant. The two products were filtered and the filter residue was washed, dried and weighed. The residue of the portion to which no NaF was added amounted to 4½ parts. The residue of the portion to which NaF was added amounted to nil, showing that in this case solution of the uranium dioxide was complete.

*Example 4*

27 grams of finely divided uranium dioxide ($UO_2$) and 10 grams of NaF were added to 140 grams of a 25% $H_2SO_4$ solution, and the mixture was heated at 80–85° C. for three hours, water being added to maintain a constant volume. The brown oxide went into solution and green crystals precipitated. The mixture was diluted with water to a total volume of one liter. The solution was a rich green and the green crystalline precipitate was completely dissolved. The solution was filtered and the filter residue was weighed. It consisted of 0.2 gram of brown oxide.

In U. S. patent application Serial Number 559,666, entitled "Recovery of Uranium from Waste Metal Products" and filed October 20, 1944, by Louis Spiegler, there is described a process for recovery of uranium from mixtures containing uranium and a more active metal in the form of oxides and fluorides or other compounds containing these elements. The process involves roasting the material with lime in air and treating the product at elevated temperatures with concentrated sulfuric acid. The product of this sulfuric acid treatment is introduced into water to dissolve the soluble components. This step produces a relatively dilute sulfuric acid solution containing uranyl sulfate and more active metal sulfate, e. g. magnesium sulfate.

The process of the present invention may be combined with the process described in the Spiegler application by employing the aqueous sulfuric acid solution, obtained as just described, for dissolving tetravalent uranium in accordance with the method of the present application. The fluorine necessary to effect solution of the tetravalent uranium may be present in the sulfuric acid solution, but fluorine in the form of a fluoride may be added with the tetravalent uranium. The resulting aqueous sulfuric acid solution of uranium sulfates may then be treated with an oxidizing agent to convert tetravalent uranium to hexavalent form and the uranium may be recovered from the solution in any convenient manner.

In the specification and claims the expression "oxide of tetravalent uranium" is intended to include the oxide, $U_3O_8$ or $UO_2.2UO_3$, in which part of the uranium is tetravalent and part is hexavalent, and the dioxide, $UO_2$, in which all of the uranium is tetravalent.

The term "alkaline earth metal" is used herein and in the appended claims to designate the elements calcium, magnesium, barium and strontium.

It will be understood that I intend to include variations and modifications of the invention and that the preceding examples are illustrations only and in no wise to be construed as limitations upon the invention, the scope of which is defined in the appended claims, wherein

I claim:

1. The method of dissolving an oxide of uranium of valence less than six, which comprises treating the oxide with dilute aqueous sulfuric acid containing a fluoride.

2. The method of dissolving an oxide of tetravalent uranium, which comprises heating the oxide with aqueous 0.5% to 50% sulfuric acid solution containing a fluoride.

3. The method of dissolving metallic uranium, which comprises roasting the metallic uranium in air to convert it to an oxide of tetravalent uranium and heating the oxide with aqueous 0.5% to 50% sulfuric acid solution containing a fluoride.

4. The method of recovering uranium from a uranium dross containing alkaline earth metal and fluorine, which comprises heating the dross with aqueous 0.5% to 50% sulfuric acid solution at a temperature between about 80° C. and the boiling point of the solution, adding an active oxidizing agent to convert tetravalent uranium to hexavalent form, and separating the uranium solution from undissolved alkaline earth metal fluoride.

5. The method of converting metallic uranium to uranyl sulfate, which comprises roasting the metal in air to convert it to an oxide of tetravalent uranium, heating the oxide with aqueous 0.5% to 50% sulfuric acid containing a fluoride, thereby converting the oxide to tetravalent and hexavalent uranium sulfates, and adding an oxidizing agent more active than sulfuric acid to the mixture to convert the tetravalent uranium sulfate to uranyl sulfate.

6. The method of converting metallic uranium to uranyl sulfate, which comprises roasting the metal in air to convert it to an oxide of tetravalent uranium, heating the oxide with aqueous 0.5% to 50% sulfuric acid containing a fluoride at a temperature between about 80° C. and the boiling point of the solution, thereby converting the oxide to tetravalent and hexavalent uranium sulfates, and adding an oxidizing agent more active than sulfuric acid to the mixture to convert the tetravalent uranium sulfate to uranyl sulfate.

References Cited in the file of this patent

UNITED STATES PATENTS 1,286,400    Pellegrin _____ Dec. 3, 1918

OTHER REFERENCES

Mellor: "Inorganic and Theoretical Chemistry," vol. 12, p. 49, Longmans, Green & Co., London (1932).